(12) United States Patent
Erikson et al.

(10) Patent No.: US 8,719,718 B2
(45) Date of Patent: May 6, 2014

(54) DIGITAL PAPER-ENABLED PRODUCTS AND METHODS RELATING TO SAME

(76) Inventors: Erik M. Erikson, Seattle, WA (US); R. Matthews Wesson, Portland, OR (US); Ira Smith, Seattle, WA (US); David McGee, Bainbridge Island, WA (US); Phil Cohen, Bainbridge Island, WA (US); Philipp Schmid, Mercer Island, WA (US); Michael Robin, Redmond, WA (US); Alex A. Arthur, Seattle, WA (US); Paulo Barthelmess, Fremont, CA (US)

( * ) Notice: Subject to any disclaimer, the term of this patent is extended or adjusted under 35 U.S.C. 154(b) by 959 days.

(21) Appl. No.: 12/118,656

(22) Filed: May 9, 2008

(65) Prior Publication Data
US 2008/0278734 A1 Nov. 13, 2008

Related U.S. Application Data

(60) Provisional application No. 60/917,034, filed on May 9, 2007, provisional application No. 60/969,552, filed on Aug. 31, 2007, provisional application No. 61/028,498, filed on Feb. 13, 2008.

(51) Int. Cl.
*G06F 3/048* (2013.01)

(52) U.S. Cl.
USPC .......................... 715/764; 715/781

(58) Field of Classification Search
CPC ............... G06F 3/048; G06K 9/00402; G06K 9/00409; G06K 9/00416
USPC .......... 178/18.01–18.03, 18.09, 19.01, 19.04, 178/20.01; 345/173, 175, 179; 382/113
See application file for complete search history.

(56) References Cited

U.S. PATENT DOCUMENTS

| | | | |
|---|---|---|---|
| 6,333,995 B1 * | 12/2001 | Perrone | 382/187 |
| 6,459,442 B1 * | 10/2002 | Edwards et al. | 715/863 |
| 6,703,570 B1 | 3/2004 | Russell et al. | |
| 6,707,473 B2 * | 3/2004 | Dresevic et al. | 715/768 |

(Continued)

OTHER PUBLICATIONS

Pfaff. Earthquake Aftermath: Investigating Insurance Claims Using ArcGIS 9 and a Tablet PC ArcUser. Jan.-Mar. 2005. pp. 54-57.*

(Continued)

*Primary Examiner* — Matt Kim
*Assistant Examiner* — Ryan Barrett
(74) *Attorney, Agent, or Firm* — Richard C. Vershave; Foster Pepper PLLC (57) ABSTRACT

A digital paper-enabled product includes digital paper with a digital pattern that spatially cooperates with one or more features or boundaries printed on the pattern. More specifically, a system cooperating with the product may include spatial information systems that manage the features or boundaries and communicates with a writing instrument that was used to effect changes to the digital paper-enabled product. In one embodiment, the digital paper-enabled product may take the form of a sheet of digital paper bearing a digital pattern and where action icons (e.g. user intended actions) and/or features (e.g. such as map features) or a spatial reference frame are printed onto the digital pattern and where at least one action palette is printed onto the digital pattern, correlated therewith, and usable to effect changes to the product. Other embodiments include a method of making the digital-enabled product, a method of processing information obtained from the digital paper-enabled product, and a method of using the digital paper-enabled product.

21 Claims, 4 Drawing Sheets

(56) References Cited

U.S. PATENT DOCUMENTS

| | | | |
|---|---|---|---|
| 6,737,591 B1* | 5/2004 | Lapstun et al. | 178/19.05 |
| 6,839,053 B2* | 1/2005 | Lapstun et al. | 345/173 |
| 6,870,550 B1* | 3/2005 | Schuster et al. | 345/639 |
| 6,947,027 B2* | 9/2005 | Lapstun et al. | 345/156 |
| 6,982,701 B2* | 1/2006 | Lapstun et al. | 345/158 |
| 6,982,703 B2* | 1/2006 | Lapstun et al. | 345/173 |
| 6,992,662 B2* | 1/2006 | Lapstun et al. | 345/173 |
| 7,002,559 B2* | 2/2006 | Ericson | 345/179 |
| 7,010,147 B2 | 3/2006 | Silverbrook et al. | |
| 7,075,522 B2* | 7/2006 | Han | 345/173 |
| 7,091,960 B1* | 8/2006 | Silverbrook et al. | 345/173 |
| 7,100,110 B2* | 8/2006 | Shiraishi et al. | 715/255 |
| 7,106,888 B1* | 9/2006 | Silverbrook et al. | 382/119 |
| 7,120,872 B2* | 10/2006 | Thacker | 715/209 |
| 7,123,239 B1* | 10/2006 | Lapstun et al. | 345/156 |
| 7,123,245 B2* | 10/2006 | Lapstun et al. | 345/173 |
| 7,133,031 B2* | 11/2006 | Wang et al. | 345/173 |
| 7,154,483 B2* | 12/2006 | Kobayashi | 345/173 |
| 7,158,675 B2 | 1/2007 | Gounares et al. | 382/187 |
| 7,170,499 B1* | 1/2007 | Lapstun et al. | 345/173 |
| 7,298,364 B2* | 11/2007 | Matsuda | 345/173 |
| 7,456,820 B1* | 11/2008 | Lapstun et al. | 345/156 |
| 7,564,995 B1* | 7/2009 | Yaeger et al. | 382/119 |
| 2003/0080948 A1* | 5/2003 | Lapstun et al. | 345/173 |
| 2003/0090463 A1* | 5/2003 | Lapstun et al. | 345/158 |
| 2003/0142072 A1* | 7/2003 | Lapstun et al. | 345/158 |
| 2003/0184527 A1* | 10/2003 | Han | 345/173 |
| 2003/0222858 A1* | 12/2003 | Kobayashi | 345/173 |
| 2003/0229859 A1* | 12/2003 | Shiraishi et al. | 715/541 |
| 2004/0075650 A1* | 4/2004 | Paul et al. | 345/173 |
| 2004/0136083 A1* | 7/2004 | Wang et al. | 359/642 |
| 2004/0150627 A1 | 8/2004 | Luman et al. | |
| 2004/0164969 A1* | 8/2004 | Matsuda | 345/173 |
| 2004/0252888 A1* | 12/2004 | Bargeron et al. | 382/188 |
| 2004/0263487 A1* | 12/2004 | Mayoraz et al. | 345/173 |
| 2005/0013104 A1* | 1/2005 | Feague et al. | 361/683 |
| 2005/0052409 A1* | 3/2005 | Lapstun et al. | 345/156 |
| 2005/0104868 A1* | 5/2005 | Lapstun et al. | 345/173 |
| 2006/0022960 A1 | 2/2006 | Fukushima | |
| 2006/0103676 A1 | 5/2006 | Schorr et al. | |
| 2006/0119591 A1* | 6/2006 | Ericson | 345/179 |
| 2006/0210173 A1* | 9/2006 | Jurion et al. | 382/229 |
| 2007/0050419 A1 | 3/2007 | Weyl et al. | |
| 2007/0050712 A1 | 3/2007 | Hull et al. | |
| 2007/0061344 A1 | 3/2007 | Dickerman et al. | |
| 2007/0129887 A1* | 6/2007 | Sakamoto et al. | 701/211 |
| 2008/0121441 A1* | 5/2008 | Sheets et al. | 178/18.01 |
| 2008/0264701 A1* | 10/2008 | Radtke et al. | 178/19.01 |
| 2008/0273797 A1 | 11/2008 | Takikawa et al. | |
| 2009/0193342 A1* | 7/2009 | Barthelmess et al. | 715/751 |

OTHER PUBLICATIONS (Pfaff), Earthquake Aftermath: Investigating Insurance Claims Using ArcGIS 9 and a Tablet PC, ArcUser, pp. 54-57; http://www.esri.com, Jan.-Mar. 2005.

Kiryakov et al., "Semantic Annotation, Indexing, and Retrieval," In Web Semantics: Science, Services and Agents on the World Wide Web (online), vol. 2, No. 1, pp. 49-79. Dec. 1, 2004.

* cited by examiner

DIGITAL PAPER-ENABLED PRODUCTS AND METHODS RELATING TO SAME

PRIORITY CLAIM

This application claims priority to U.S. Provisional Patent Application Nos. 60/917,034 (filed on May 9, 2007), 60/969,552 (filed on Aug. 31, 2007), 61/028,498 (filed on Feb. 13, 2008), the subject matter of each are incorporated herein by reference in their entirety.

FIELD OF THE INVENTION

This invention relates generally to a digital paper-enabled product having digital paper with a digital pattern that spatially cooperates with one or more features or boundaries printed on the pattern, and more specifically to spatial information systems that manage the features or boundaries and communicates with a writing instrument previously used to effect changes to the digital paper-enabled product.

BACKGROUND OF THE INVENTION

Spatial information systems (spatial information system) allow for the creation, review, update, and deletion (CRUD) of data items which have the distinguishing characteristic of a spatial aspect. In general, spatial information systems include data repositories, which may include various levels of definition of the data within the data repositories. For example, the various levels of definition may provide attributes, boundaries, values and other defining aspects of the data. The spatial information system may otherwise be referred to as a spatial data model for storing and managing the data.

The data repositories may take the form of files, databases, or any other accessible means of storage and may include a repository for geo-spatial information. Further, the data repositories may be configured for accessibility and operational efficiency and where access to the data is accomplished through high-speed and electro-physical or photo-physical devices.

Each of the manners through which spatial information systems afford CRUD of parts of the model must account for the implicitly mentioned disconnection between the model (contained within the spatial information system) and the external artifacts which are being modeled. The disconnection between the model and the external artifact may cause or increase an amount of error and expense. The distance between point of model access and the modeled artifacts are generally a result of the physical actuality of the artifacts on one hand and the physical constraints, related to infrastructure requirements such as electrical transmission and environmental concerns, of computer systems on the other.

Mobile computing platforms such as laptops, hand held computing devices, and equivalent devices have been utilized to extend the mobility of the model into field environments, for example into environments that do not have computing infrastructure. By way of example, non-computing platforms of the model within the spatial information system may take the form of a blueprint, map, diagram, etc. The non-computing platforms may survive greater extremes of environmental concerns, are less expensive to generate and reproduce, may provide a larger display size and a higher resolution, and may be easier to use, which further reduces training costs.

A digital paper system includes a writing surface and a writing utensil in which the utensil knows its location in real time when it is marking on the surface. The writing surface may take the form of a digital tablet or digital paper, for example digital paper made by the Anoto Group AB and having an ANOTO® pattern. Various types of conventional digital pens include, but are not limited to, the MAXELL® digital pen, the NOKIA® digital pen, the LEAPFROG FLY-FUSION® digital pen, the ANOTO® digital pen, and the LOGITECH® digital pen. Besides knowledge of placement location, some digital paper systems also maintain records of information like pressure or time as well as various "state" values such as color or width.

Similarly to technological devices like routers, repeaters, etc. which can be classified as existing within the physical layer of the internet protocol technology stack, the digital paper utensil and surface are a physical layer of the digital paper technology "stack". These two physical artifacts are part of an interaction within which there is nothing but intrinsic and state information. A transmission layer exists above the physical, but the system requires a further layer above these, referred to as a semantic layer, in order to become useful.

The semantic layer provides a grounded regional description of the writing surface and any significant regions upon it, such as an 8.5"×11" region that encompasses an entire page and may be used for freehand sketches. In more complex cases, the semantic layer may include a number of areas, with many possible relational aspects between them where each may have a rich individual, shared, or composed meaning to assign writing related to them. These regional areas are usually, though not necessarily, communicated to users via visual indication like the placement of a label next to a horizontal line or box upon which one is to write their name on a form.

Using these layers, the writing placed upon the writing surface with the utensil may be characterized with a myriad of possible placement schemes using either the regional definitions, semantic definitions, or their fusion and thereby assigning character according to the regional semantic definitions. The writing may be interpreted according to its characterization, where the interpretation may be determined through handwriting recognition, detecting a change of user intention, or the performance of some action.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details or with various combinations of these details. In other instances, well-known systems and methods associated with, but not necessarily limited to, spatial information systems, digital paper systems, digital pens and methods for operating the same may not be shown or described in detail to avoid unnecessarily obscuring descriptions of the embodiments of the invention.

The present invention is generally directed to a digital paper-enabled product for digital data collection using digital paper systems, such as maps, blueprints, diagrams, CAD drawings, and other documents having spatially relevant information printed or applied thereon. The digital paper-enabled product allows a user to create, import, edit, share, and act on paper-based data in and between geographic information systems (GIS). In one embodiment, the system is compatible with geodatabase feature classes, such as personal and enterprise ArcSDE®. In the same or alternate embodiment, the system enables the user to print out any ArcGIS® map and feature legend on digital paper, and then make changes and annotations to the map by simply writing on the printed map with a writing utensil, such as a digital pen.

At least one embodiment of the present invention relates generally to a digital paper-enabled product having digital paper with a digital pattern that spatially cooperates with one or more features or boundaries printed on the pattern, and more specifically to spatial information systems that manage the features or boundaries and communicates with a writing instrument previously used to effect changes to the digital paper-enabled product. In one embodiment of its product form, the digital paper-enabled product may take the form of a sheet of digital paper bearing a digital pattern and where features (e.g. such as map features) or a spatial reference frame are printed onto the digital pattern and where at least one action palette is printed onto the digital pattern, correlated therewith, and usable to effect changes to the features. Other embodiments include a method of making the digital-enabled product, a method of processing information obtained from the digital paper-enabled product, and a method of using the digital paper-enabled product. By way of example, a user may use a writing instrument or indication device, such as a digital pen, to alter one or more aspects (e.g. the features, boundaries, etc. printed on the digital pattern) through executable actions produced by interaction of the writing instrument with the digital paper-enabled product.

In one aspect of the present invention, a digital paper-enabled product includes a digital paper system comprised of a physical document bearing a digital pattern and having at least one identifiable region spatially correlated to the digital pattern using a first coordinate system. The product further includes an action palette overlaid onto and spatially correlated to the digital pattern using a second coordinate system, the action palette having at least one symbol that is selectable by a selection device to generate an editorial action with respect to a feature managed by a spatial information system, wherein the editorial action occurs within the at least one identifiable region.

In another aspect of the present invention, a method of making a digital paper-enabled product includes the steps of (1) arranging at least one symbol within an action palette, which includes a first coordinate system co-operable with a digital pattern carried by a document, the at least one symbol manageable by a spatial information system and having a spatial relationship to at least one other feature managed by the spatial information system; (2) selecting a spatial reference frame having a second coordinate system co-operable with the digital pattern carried by the document; (3) applying the action palette onto the digital pattern of the document, wherein the at least one symbol becomes spatially determinable using the first coordinate system in conjunction with the digital pattern; (4) applying the spatial reference frame onto the digital pattern of the document, wherein the spatial reference frame includes at least a bounded region that is spatially determinable using the second coordinate system in conjunction with the digital pattern; and (5) positioning the action palette with respect to the spatial reference frame on the document.

In yet another aspect of the invention, a method of processing information obtained from a digital paper-enabled product includes (1) receiving information with a writing utensil that indicated a modification of at least one feature of the digital paper-enabled product, the at least one feature having a property associated therewith and correlated to a digital pattern on digital paper; (2) placing the writing utensil in communication with a spatial information system configured to manage the at least one feature; (3) transferring the information from the writing utensil to the spatial information system to update the property of the at least one feature within the spatial information system; and (4) synchronizing the spatial information system to generate an updated version of the digital paper-enabled product.

And still yet in another aspect of the invention, a method of using a digital paper-enabled product when de-coupled from a spatial information system includes the steps of (1) accessing the digital paper-enabled product having a sheet of digital paper bearing a digital pattern and having at least one identifiable region spatially correlated to the digital pattern with a coordinate system; (2) indicating on the product an editorial action effecting a property of a feature managed by a spatial information system; and (3) recording the editorial action with an indicating device.

Figure 1A:
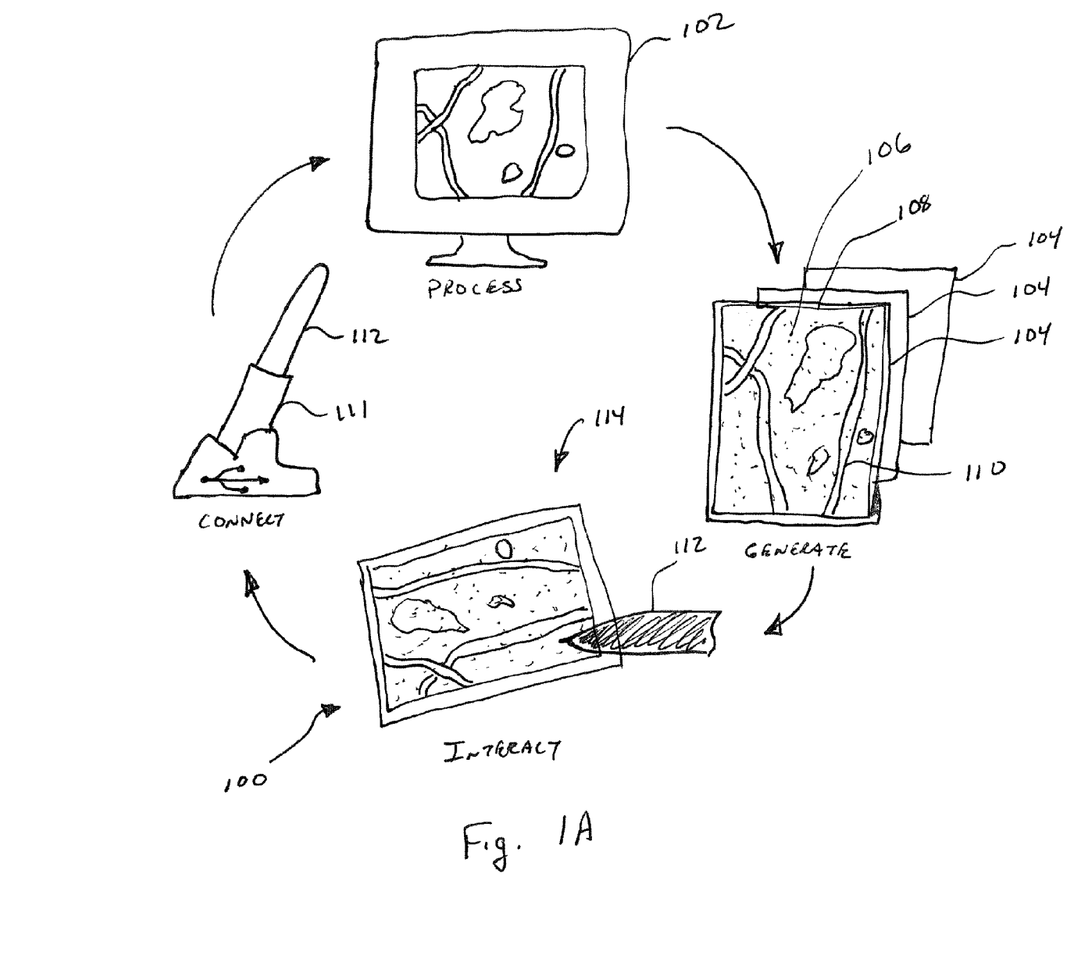
FIG. 1A is a process diagram showing a digital paper-enabled product according to an embodiment of the present invention.
Figure 1B:
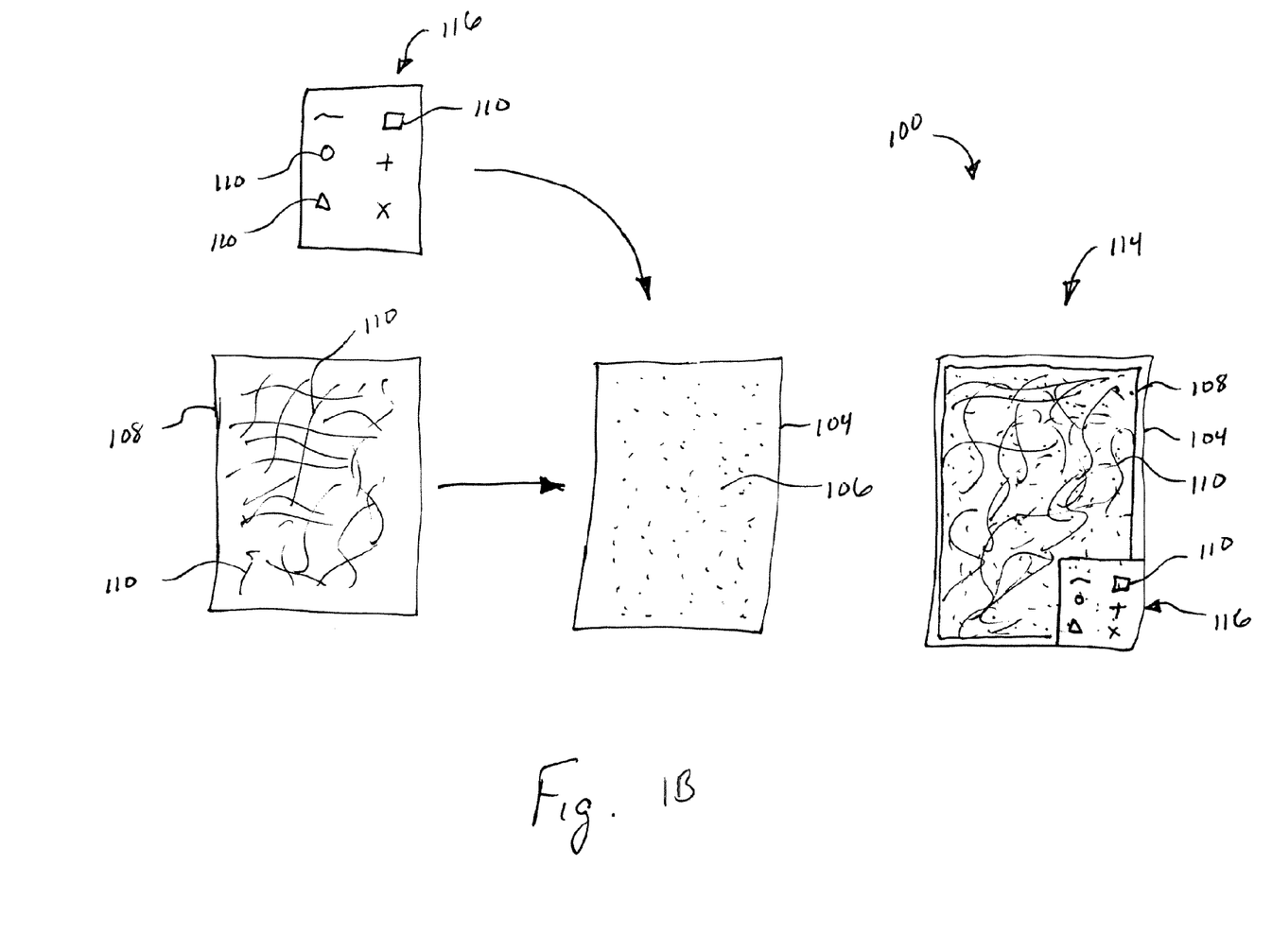
FIG. 1B is a process diagram showing the making of a digital paper-enabled product according to an embodiment of the present invention.

FIGS. 1A and 1B show a digital paper-enabled product 100 having a spatial information system 102 with data stored, managed or otherwise controlled therein. In the illustrated embodiment, the spatial information system 102 takes the form of computational processing device, such as a computing device, which may be, but is not limited to, a personal, mainframe, handheld, or other type of computer with sufficient memory and computing capacity to process the data. The data, in turn, may digitally define features, icons, graphical elements, symbols, characters, indicia, mathematical or computational elements, or any other feature (hereinafter generally referred to as feature or features) that may be used to represent some portion of a map, blueprint, drawing, photo, image, diagram, or other document. The features may have spatial relationships with respect to one another, to a desired coordinate system, and to their location on a digital pattern on a sheet of digital paper. By way of example, the features may be geo-spatial features used to produce a map. In one embodiment, the spatial information system 102 takes the form of an ARCGIS® system and includes computational, design, display and other tools for modeling geographic information. It is appreciated that the spatial information system may take other forms that are unrelated to geo-spatial or geo-relational data. Further to the example, the ARCGIS® system may allow a user to author data, maps, globes, and models on a desktop or laptop computer; serve them to a geographic information system (GIS) server; and access the data through the internet and mobile clients.

The digital paper-enabled product 100 includes digital paper 104 (FIG. 2) having a digital pattern 106 (FIG. 2) applied thereon and at least a spatial reference frame 108 or feature 110 (e.g., terrain, physical object, symbol, and any suitable representation thereof) (FIG. 3) arranged on the digital paper 104. The digital paper 104 may include boundaries (height=X; width=Y) that are adaptable to various size sheets and customizable as desired for a variety of applications. The digital paper 104 may also be referred to as interactive paper. In one embodiment, the spatial reference frame 108 may take the form of a bitmapped boundary without any other features 110 located therein, such that the features 110 are to be added by a user after the boundary has been printed onto the digital pattern 106.

Figure 2:
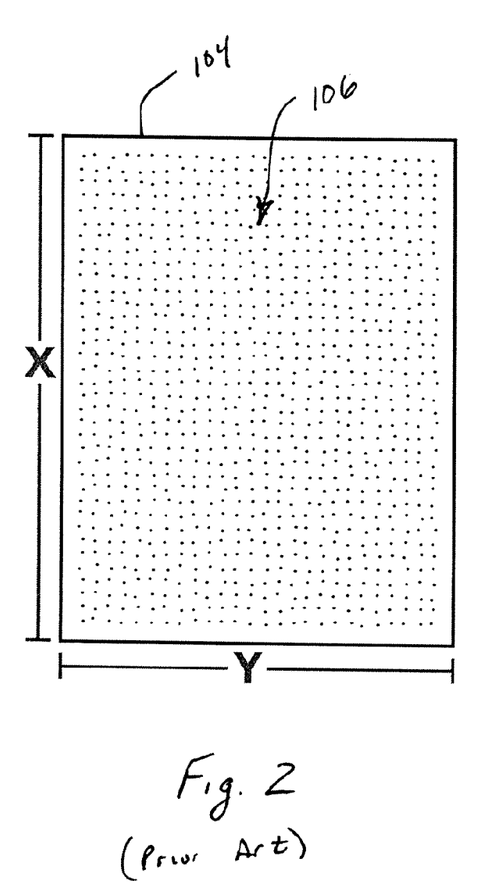
FIG. 2 is a top plan view of a prior-art sheet of digital paper with a desired pattern applied thereon.
Figure 3:
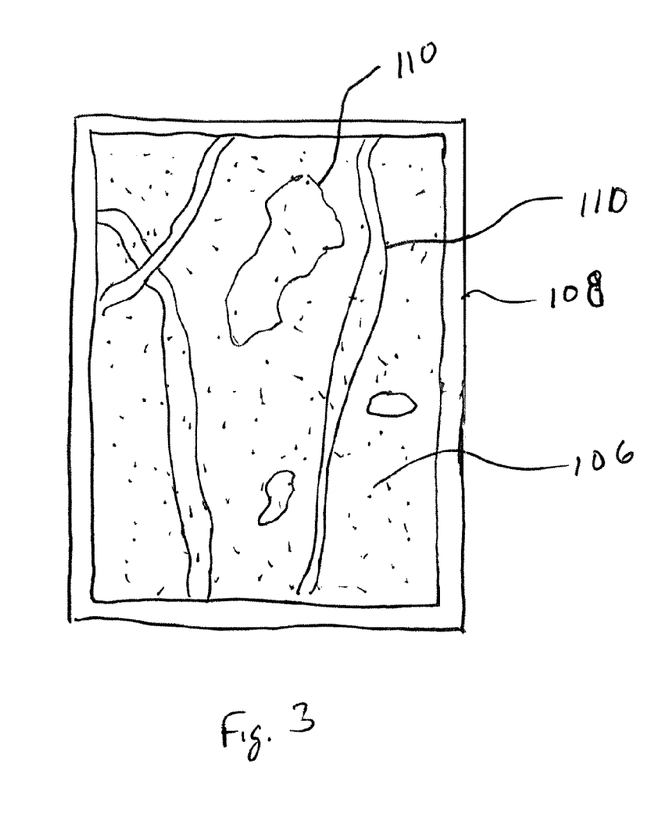
FIG. 3 is a top plan view of a prior-art document having map features printed thereon.

The digital pattern 106 may interact with writing utensil 112, which may otherwise be referred to as an indicating device or a selection device that may or may not employ ink during use. By way of example, the writing utensil 112 may take the form of a digital pen used to mark on, select, indicate, or otherwise interact with the spatial reference frame 108 and/or one or more action icons or features 110. The digital pattern 106 may generally take the form of a dot pattern that uniquely identifies positional coordinates on the digital paper 104 and particularly within the spatial reference frame 108. In one embodiment, the pattern 106 takes the form of an ANOTO® pattern. The writing utensil 112 may be used to store, record or even contemporaneously transmit any information such as any marks, selections, indications or interactions that effect one or more of the features 110. Information stored or recorded may be transmitted or uploaded to the spatial information system 102 at a later time, for example when the user docks the digital pen into a docking station 111 coupled to the spatial information system 102.

Once the spatial reference frame 108 and/or features 110 have been applied onto the digital pattern 106, for example printed onto the digital pattern 106, the resulting document may be referred to as a digital paper-enabled document 114. The spatial reference frame 108 and/or features 110 may or may not be visible, and may be editorially actionable or benign. The term editorial action as used herein may refer to a variety of interactions, requests, selections, queries and other activities that may be expressly initiated by the user and/or interpreted with respect to the digital paper-enabled document 114. By way of example, the user may query information from the document 114, such as route distances (as traveled or point-to-point), request general details about one or more features (e.g., request the square footage and number of floors of a selected building), find a desired business location, locate all features of a certain type within the operable boundaries of the document 114, and many other tasks or actions. Editorial action may further refer to spatial data actions, such as spatial queries and spatial processing activities, which may include creation, review, update, and deletion. A query may include querying to a list, for example creating, importing, editing, and sharing information with regards to a list or data table.

Figure 4:
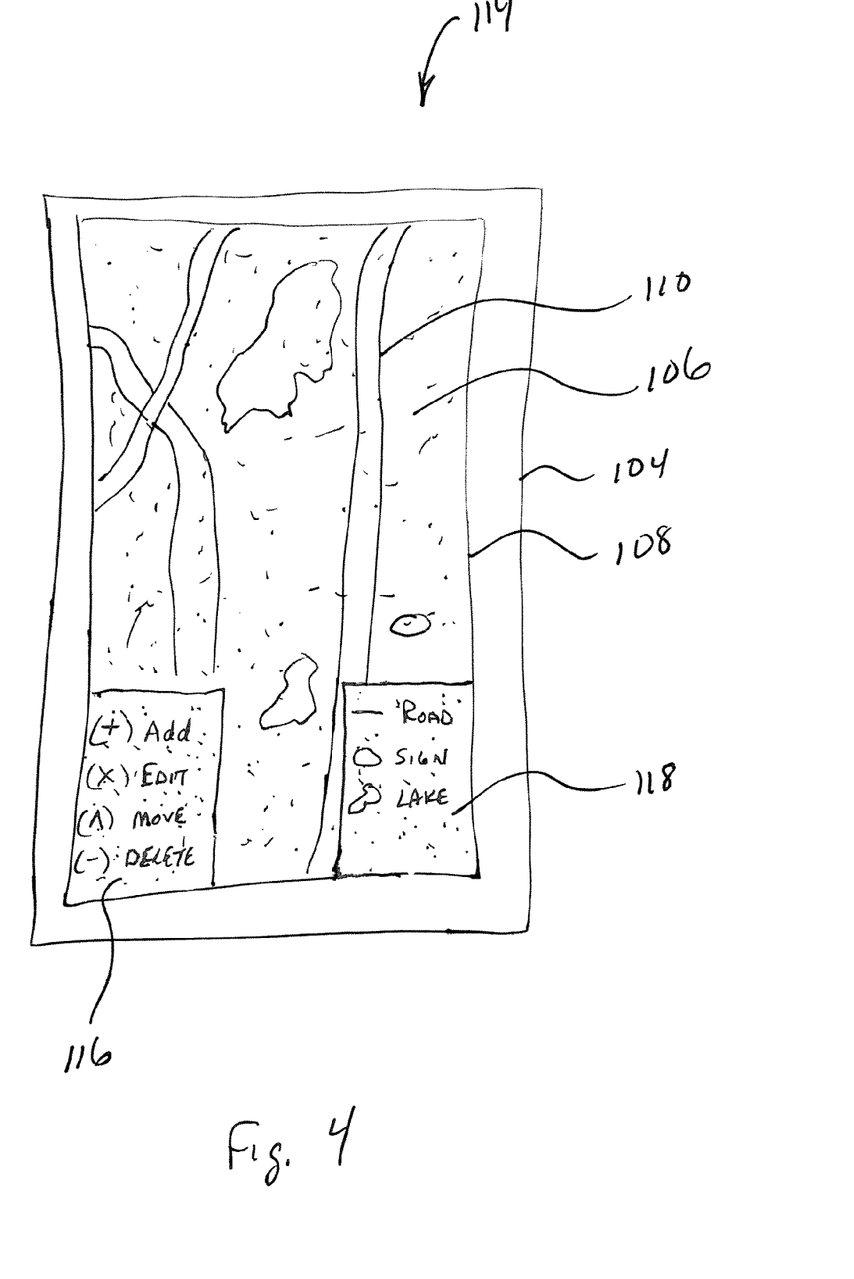
FIG. 4 is a top plan view of a digital paper-enabled document having action palettes according to an embodiment of the present invention.

Referring to FIG. 4, when the digital document 114 is generated (e.g., printed), the printed version may be referred to as a static or frozen version because changes to the document may only be made through interaction with an active version (e.g., digitally accessible) or through interaction with the writing utensil 112 (FIG. 1) as described below.

Referring briefly back to FIG. 1 and by way of example, the writing instrument 112 may provide a series of ink strokes placed on one or more pages of the digital paper 104, where the location of each stroke relative to the underlying pattern 106 is recorded. This information may then be received by the spatial information system 102 such that the digital document 114 may be updated based on the actions or operations of the writing instrument 112 remote from spatial information system 102. For example, if the digital paper 104 was printed with an image displayed thereon, the location of the strokes could be determined relative to the image or portions of the image using one or more coordinate systems associated with the digital pattern 106. Through this analysis, the product 100 may interpret what the user meant to do when placing the strokes on the document 114. These aspects of the invention and more are explained in more detail below in the description related to the legend and palette.

In one embodiment, the ink strokes from the writing utensil 112 are assigned a meaning or alternatively stated the strokes are assigned semantics that correlate the actions of the writing utensil 112 with features, images, or other geo-spatial information printed on the digital paper 104. By way of example, the product 100 attempts to decide what areas the user intended the ink stroke to cover by counting what ratio of the stroke was in each region or area of the digital paper, and then assigning that stroke to the area in which the majority of the stroke occurred. The "majority" decision may be resolved by counting points in the stroke, or by weighting the length of each segment of the stroke.

In another embodiment, the product 100 applies an algorithm to denote certain areas (e.g. the boundaries of a legend located on a printed map) as being higher priority than the map area. The algorithm divides the ink stroke into many equally spaced points, and then for each point, assigns that point to the highest-priority area for which it is located within (note that a single point could be inside multiple areas, with overlapping areas.) Then, the algorithm chooses the highest priority level for which any points were found, and examines that priority level to discover which area had the most votes or the highest value at that priority level. The "high value" area becomes the area to which the stroke is assigned. Using this system, the user may have any number of overlapping areas, and their semantics may be kept distinct, as long as the ink strokes are assigned distinct priority levels by the decisions made when the writing utensil is used to originally mark on the digital paper 104.

The digital paper-enabled product 100 integrates the spatial information system 102 with the digital paper 104 according to an embodiment of the present invention. More specifically, the digital paper-enabled product 100 provides for a user or multiple users to create, revise, update, delete and possibly review the frozen version of the digital document 114 through interaction with the writing instrument 112 and/or through direct interaction with an active version of the digital document 114.

Digital-paper-enabling as used herein includes providing the ability to create, modify and/or delete portions and subportions of the spatial information system 102, to include the underlying modeling data that may define one or more attributes or values for the features that may be printed on the digital paper 104. Again, the features may include any feature that has some spatial relationship to other features to form a map, CAD drawing, diagram, etc.

As will be described in greater detail below, the digital paper-enabled product 100 integrates the spatial information system 102 with the digital paper 104 to create both active and frozen versions of maps, diagrams, CAD drawings, and other such digital documents 114 that may be modified in some manner by one or more users. The operation of the product 100 may include the following processes: (1) generating the digital document 114, also referred to as a display model 114, from the spatial information system 102, such as generating at least a portion of the map, diagram or CAD drawing; (2) interacting with the display model 114 using the writing utensil 112 through an active legend and possibly through an action palette (both of which are described below); (3) connecting the results of the user's interactions on the frozen version of the display model 114 to the spatial information system 102; and (4) processing the data received by the writing utensil 112 to update the spatial information system 102 and in turn update the display model 114.

Generating the display model or digital document 114 from the spatial information system 102, which may include, but is not limited to, generating at least a portion of the map, diagram or CAD drawing, and may involve creating features by querying the spatial information system 102 and then generating two-dimensional or three-dimensional graphical elements (e.g., points, lines, curves, etc.) to form the document 114. The data within the spatial information system 102 provides the definitions, boundaries, attributes, actions and other aspects of the features 110 using associated attribute tables, value tables, property tables, coordinate tables, etc., which may or may not be combined into a single table. Alternatively, generating the display model 114 may involve querying the spatial information system 102 to generate non-spatial graphical representations such as forms or data grids, which may be filled in by the user. In turn, the data may be altered without further querying the spatial information system 102 and then re-inserted into the spatial information system 102 at a later time.

In another embodiment, generating the display model or digital document 114 may include the generation of semantic descriptions by querying and analyzing the spatial information system 102. The semantic descriptions are those derived by an interpretation of the user's actions when interacting with the product 100.

The product 100 is an interactive system, meaning that in most instances the user may interact with the digital paper 104 with the writing utensil 112. In one embodiment, the product 100 is configured to permit the user to communicate with the writing utensil 112 while the system interprets or attempts to interpret the user's intentions.

Referring again to FIG. 4 and by way of example, the digital document 114 takes the form of a digital map 114 printed onto the pattern 106 of the digital paper 104 and includes a first action palette 116 and a second action palette 118 (hereinafter referred to as a legend 118). Both the palettes 116, 118 may include action icons or features 110. In one embodiment, the first action palette 116 includes action icons that invoke a desired "action" related to the spatial data located on the document 114. And, the second action palette or legend 118 includes features 110 that may or may not have encoded or embodied actions pertaining thereto. Thus, the features 110 in the legend 118 may take the form of representations relevant to the document 114. For a map, for example, the features 110 may be roads, bridges, walkways, landmarks, signs, etc. For a blueprint, the features 110 may be building furnishings, offices, restrooms, etc. For CAD drawings, the features 110 may be gears, levers, rods, hydromechanical symbols, electrical symbols, computer symbols, etc.

Interacting as used herein generally refers to using a document with spatially interacting features printed on digital paper, which may include the ANOTO® pattern printed under the features as a watermark. In the field, the user may create, edit, move, and delete features on the document with a writing utensil by selecting items from a legend and placing them on the document. The user may also select desired editorial actions from an action palette. After the document has been annotated, the associated data may be uploaded into a spatial information system 102 to interpret the strokes of the writing utensil 112 and then accurately integrate any changes into a new version of the document 114, which may be printed at a later time.

When interacting with the frozen version of the digital document 114, the user may use the writing instrument 112 to select the editorial action in the first action palette 116 (e.g., add, revise, move, delete, etc.), then select the feature in the legend 118, and then select a point or region on the map 114 outside of the boundaries of the legend 118 and palette 116. For example, the map 114 may be a representation of several city blocks and the user may want to add features to the map 114 for an upcoming parade and then provide the revised map 114 to parade organizers. While in the field, the user may select the "add" icon from the action palette 116 on a frozen version of the map 114, then select the "set of bleachers" feature from the legend 118. And still using the writing instrument 112, the user places the bleachers along a desired street displayed on the map 114. Likewise, the user may take other or subsequent actions like "revise," "move," or "delete" with respect to the same or other features provided in the legend 118. Again, such interactions are not limited to maps, but may be for other documents such as blueprints, CAD drawings, diagrams, etc. In one embodiment, the legend 118 and/or the palette 116 are not located on the digital document 114, but instead displayed on a separate tablet or device, such as, but not limited a handheld computing device, personal computing tablet, or equivalent device.

Once again referring back to FIG. 1, the writing instrument 112 is configured to cooperate with the active legend 118 to select a desired feature and to cooperate with the action palette 116 to receive an actionable command. The information recorded by the writing instrument 112 may be downloaded to the spatial information system 102 through a variety of means, such as the docking station 111 having a USB cable or a wireless (e.g., Bluetooth) connection to the spatial information system 102. The writing utensil 112 may use ink or an equivalent, visible marking substance as it captures the writing digitally with an infrared camera. The writing utensil 112 may further include an image processor, a memory and a rechargeable power supply.

When interacting, the user's actions with the writing utensil 112 may indicate that data is to be created, edited, moved, or deleted and further provide an indication of what action or actions were to occur next. For example, the user may desire to create or add a bus stop at a desired location of a blueprint for a transit system. The user takes steps similar to those discussed above and thus the "add" action may become semantically grounded within the product 100.

In another example, the user may choose to delete the bus stop or an entire portion of the transit system. The deletion of the bus stop may be indicated, in part, by the deletion of what had once been a transit transfer point by selecting this item or feature from the active legend 118 in combination with the icon from the action palette 116. In one embodiment, the action may be bounded by a domain of accepted values corresponding to the selected feature. The domain of selected values may include, but not limited, dimensions, type, material, interface requirements, etc. In addition, when the feature is placed using the writing utensil 112, it may be spatially bounded or constrained by delineating (e.g., drawing or marking) a boundary or perimeter around the feature with the writing utensil. The delineation of the boundary may also be used to indicate the movement, revision, or deletion of whole classes of features. In yet another type of interaction, the product 100 may determine a route from a first location to a second location when the user selects each location, in order, with the writing utensil 112. After such a selection, the user may select an icon on the action palette 116 identified as "calculate route," or "determine distance," or any other type of route-related information. The product 100 then performs the action and reports the results to the user through a display interface, such as a computer screen.

As described above, the user, though the use of the digital paper 104, may bring the spatial information system 102 or a portion thereof in the form of a frozen model 114 (e.g., map) with them into a field environment and interact directly with the model 114. However, the actions taken may not automatically be applied in real time to the spatial information system 102 or the model 114. To bring effect to the actions, the user will have to connect at least the writing utensil 112 to the spatial information system 102. Such a connection may take various forms, such as, but not limited to a wireless or Bluetooth transmission either in real time or in a batch mode, a wired connection, for example through a USB cable, or some other known method of transferring data from one device or system to another. The product 100 may include various checks and balances during data transmission to insure the data is transmitted completely and correctly to the spatial information system.

In one embodiment, the transmission of the data includes transmitting the data from the digital paper system 104 to a local computing or data storage system that is not able to actively update the spatial information system 102. And then, the data may be re-transmitted from the local computing or data storage system to an active or updatable version of the spatial information system. In one embodiment, such a re-transmission may be performed by a COVELUS™ cell phone routing system. Advantageously, the initial transmission and re-transmission of the data may be performed concurrently, thus providing almost immediate feedback for the user or a reviewer. It is appreciated that the spatial information system 102 and the data used to generate the digital document 114 may reside on a single or central system and that updates may only be effective when a connection is made with the single or central spatial information system 102.

Processing includes applying the user's intentions to the spatial information system 102 and to the model or document 114 and may further include interpretation of the user's intentions. In addition and after processing, all changes or only certain changes may be process for review, correction, and acceptance as a way to validate the interpretations.

Processing may include receiving information from the writing utensil 112 and interpreting at least portions of that information based on a form relevant to the domain of the spatial information system 102 and in accordance with any supported CRUD actions. In one embodiment, processing may take the form of creating a feature class instance, which can be formed by the contextual information (say school house), spatial information (say geo-coordinates 140.9023E, 50.33321N), and [optionally] explicit information from a particular entry (say K-5, 425 students, 25 teachers). The creation and initialization of the feature class instance may then be added to a layer that contains such objects (from the map used to generate the original writing surface).

As briefly discussed above, processing may include interpreting the user's intentions and/or interactions through the processes of assignment and annotation. The user's intentions and/or interactions may be processed based on their semantic context. In the case of a stroke written upon the simple palette of an ArcGIS® map, a user intention to create or add desired feature may be interpreted by the user not selecting any conflicting actions from the action palette 116. This interpretation may become the default for any following strokes.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A digital paper-enabled product comprising:
    a digital paper system including a physical document bearing a digital pattern and having at least one identifiable region spatially correlated to the digital pattern using a first coordinate system;
    an action palette overlaid onto and spatially correlated to the digital pattern using a second coordinate system, the action palette having at least one symbol that is selectable by a writing utensil to generate an editorial action with respect to a feature managed by a spatial information system, wherein the editorial action occurs within the at least one identifiable region; and
    a processing system configured to assign semantics to one or more ink strokes made by the writing utensil onto the digital paper system, wherein the assigned semantics are determined by dividing the one or more ink strokes into equally spaced points and then assigning each point a priority level based on at least one area in which the point is located with respect to the document, and wherein the processing system determines which area includes the most points at a selected priority level.

2. The product of claim 1, wherein the spatial information system includes spatial data defining the feature and wherein the feature includes a spatial relationship to at least one other feature managed by the spatial information system.

3. The product of claim 2, wherein the feature includes at least one property that distinguishes the feature from the at least one other feature.

4. The product of claim 2, wherein the action palette includes at least one action icon.

5. The product of claim 2, wherein the spatial data includes geo-spatial data.

6. The product of claim 1, wherein the first coordinate system and the second coordinate system include the same reference origin.

7. The product of claim 1, wherein the first coordinate system and the second coordinate system include different reference origins.

8. The product of claim 1, wherein the writing utensil includes a digital pen configured to receive information based on generating the editorial action.

9. The product of claim 1, wherein the spatial information system includes a computing system having a repository for geo-spatial information.

10. The product of claim 1, wherein assigning the semantics includes determining a ratio of one or more strokes with respect to a particular area of the digital paper system.

11. A method of making a digital paper-enabled product, the method comprising:
    arranging at least one action icon within an action palette, which includes a first coordinate system co-operable with a digital pattern carried by a document, the at least one action icon manageable by a spatial information system and having a spatial relationship to at least one other feature managed by the spatial information system;
    selecting a spatial reference frame having a second coordinate system co-operable with the digital pattern carried by the document;
    applying the action palette onto the digital pattern of the document, wherein the at least one action icon becomes spatially determinable using the first coordinate system in conjunction with the digital pattern;

applying the spatial reference frame onto the digital pattern of the document, wherein the spatial reference frame includes at least a bounded region that is spatially determinable using the second coordinate system in conjunction with the digital pattern;

positioning the action palette with respect to the spatial reference frame on the document; and assigning semantics to one or more ink strokes applied to the digital paper system, wherein assigning semantics includes dividing the one or more ink strokes into equally spaced points and then assigning each point a priority level based on at least one area in which the point is located with respect to the document, and determining which area includes the most points at a selected priority level.

12. The method of claim 11, wherein selecting the spatial reference frame includes selecting a boundary within which printed features are printed.

13. The method of claim 11, wherein applying the action palette onto the digital pattern of the document includes printing the action palette onto the digital pattern of the document.

14. The method of claim 11, wherein applying the spatial reference frame onto the digital pattern of the document includes printing the spatial reference frame onto the digital pattern of the document.

15. A method of processing information obtained from a digital paper-enabled product, the method comprising:

receiving information with a writing utensil that indicated a modification of at least one feature of the digital paper-enabled product, the at least one feature having a property associated therewith and correlated to a digital pattern on digital paper;

placing the writing utensil in communication with a spatial information system configured to manage the at least one feature;

transferring the information from the writing utensil to the spatial information system to update the property of the at least one feature within the spatial information system;

synchronizing the spatial information system to generate an updated version of the digital paper-enabled product; and assigning semantics to one or more ink strokes applied to the digital paper-enabled product, wherein assigning semantics includes dividing the one or more ink strokes into equally spaced points and then assigning each point a priority level based on at least one area in which the point is located with respect to the document, and determining which area includes the most points at a selected priority level.

16. The method of claim 15, wherein receiving information with the writing utensil that indicated the modification of the at least one feature of the digital paper-enabled product includes receiving information indicating the at least one feature was added to the digital paper-enabled product.

17. The method of claim 15, wherein placing the writing utensil in communication with the spatial information system includes coupling the writing utensil to a computing system having a geo-database.

18. The method of claim 15, wherein transferring the information from the writing utensil to the spatial information system includes wirelessly transferring the information.

19. A method of using a digital paper-enabled product when de-coupled from a spatial information system, the method comprising:

accessing the digital paper-enabled product having a sheet of digital paper bearing a digital pattern and having at least one identifiable region spatially correlated to the digital pattern with a coordinate system;

indicating on the product an editorial action effecting a property of a feature managed by the spatial information system;

recording the editorial action with an indicating device;

applying a plurality of ink strokes onto the digital paper with a writing utensil; and assigning semantics to the plurality of ink strokes to correlate the actions of the writing utensil with the feature managed by the spatial information system, wherein assigning semantics includes dividing the plurality of ink strokes into equally spaced points and then assigning each point a priority level based on at least one area in which the point is located with respect to the document, and determining which area includes the most points at a selected priority level.

20. The method of claim 19, wherein indicating on the product the editorial action includes using the indicating device to select an icon on an action palette printed on the digital paper over the digital pattern.

21. The method of claim 19, wherein recording the editorial action with the indicating device includes recording the editorial action with a digital pen.

* * * * *